Figure 1:
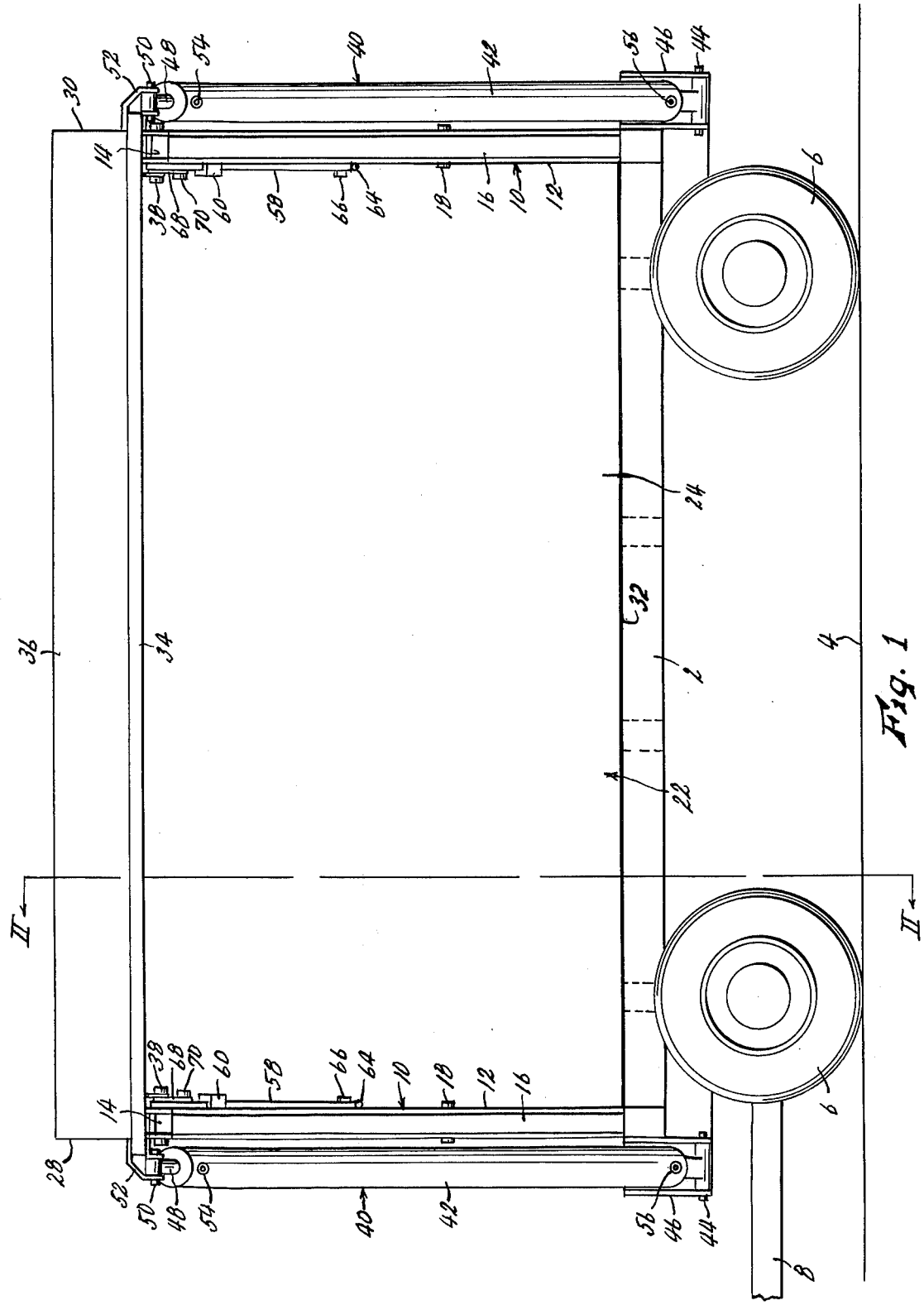

United States Patent [19]

Bishop

[11] 4,029,357
[45] June 14, 1977

[54] STRUT EXTENSION LOCK FOR DUMP TRUCKS

[75] Inventor: Jerald W. Bishop, Osborne, Kans.

[73] Assignee: Gilmore-Tatge Manufacturing Co., Inc., Clay Center, Kans.

[22] Filed: Oct. 28, 1975

[21] Appl. No.: 626,249

[52] U.S. Cl. .................................. 298/11; 298/13; 298/38

[51] Int. Cl.² .......................................... B60P 1/34

[58] Field of Search ............... 298/11, 12, 22 P, 38, 298/18, 13

[56] References Cited

UNITED STATES PATENTS

| 3,083,058 | 3/1963 | Walstrom | 298/22 P X |
| 3,880,468 | 4/1975 | Steingas | 298/11 |

Primary Examiner—L. J. Paperner
Assistant Examiner—George F. Abraham
Attorney, Agent, or Firm—John A. Hamilton

[57] ABSTRACT

In a dump truck including a base supporting a dump bucket supported pivotally along one of its upper edges at the upper ends of vertically extending telescoping struts carried by the base, and power devices connected to the top edge of the bucket in transversely spaced relation from its pivotal axis and operable to raise the bucket, whereby the bucket is first raised in a non-tilted position by extension of the struts, and then tilted to a dump position about its pivotal axis, the provision of a locking latch operable to secure the struts releasably in their extended positions, the latch being activated by movement of the bucket away from its horizontal position, and deactivated by the return of the bucket to its horizontal position.

3 Claims, 6 Drawing Figures

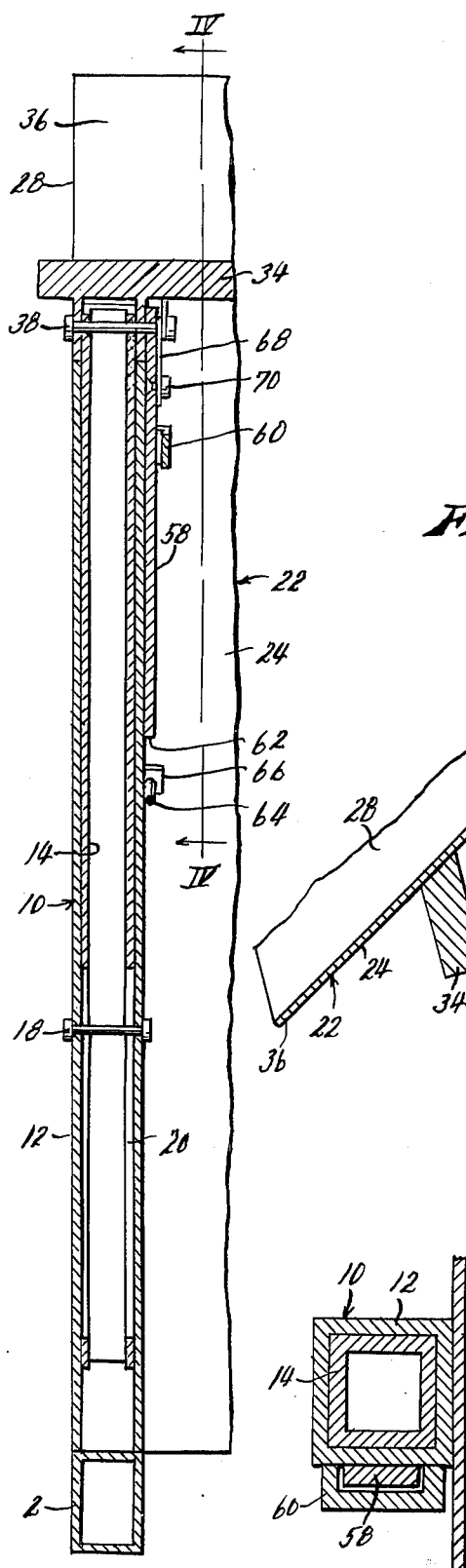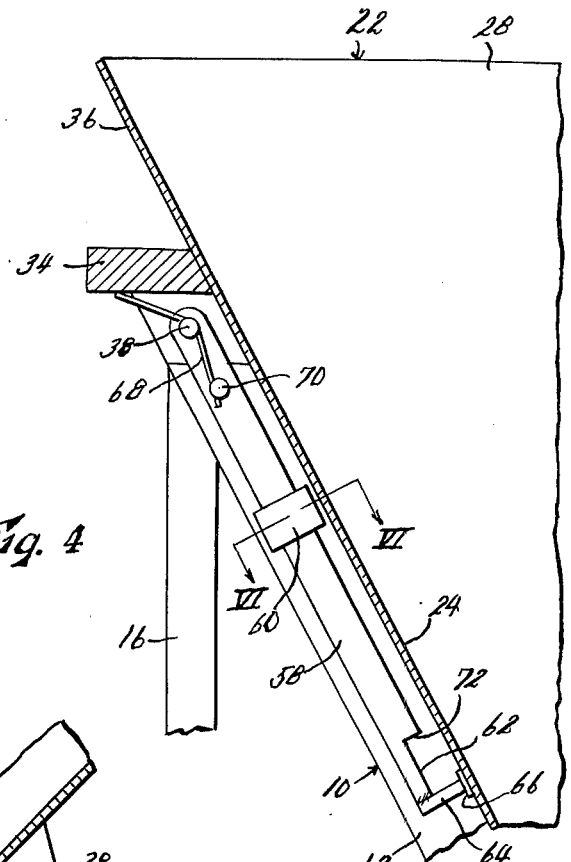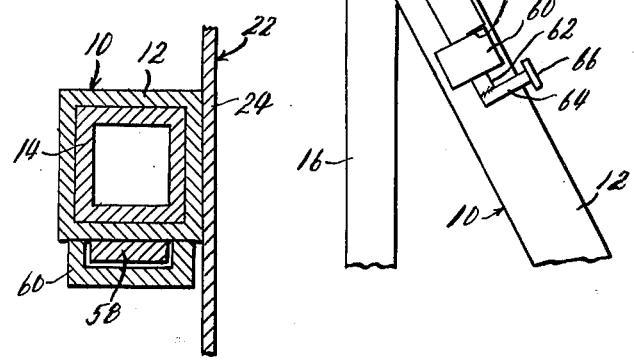
Fig. 3  Fig. 4  Fig. 5  Fig. 6

STRUT EXTENSION LOCK FOR DUMP TRUCKS

This invention relates to new and useful improvements in powered dump trucks, and has particular reference to a new and novel means for better supporting and guiding the dump bucket of the truck during the dumping operation.

In a widely used type of dump truck, that shown in the Kostman U.S. Pat. No. 3,844,617, issued Oct. 29, 1974 being selected as an example, a dump bucket is supported by a wheeled bed, being pivoted along one of its upper side edges to the upper ends of upwardly and outwardly inclined telescoping struts affixed to the bed. Power means, usually hydraulic rams, are interconnected between the bed and points at the upper edge of the bucket spaced transversely apart from its pivotal axis. Thus extension of the hydraulic rams first elevates the bucket in a horizontally upright position by extending said struts to the limit of their extension, then tilts the bucket to a dump position about its pivotal axis. The inclination of the struts provides that the bucket is offset transversely from the truck bed, as well as elevated, before it is tilted to dump, both the elevation and lateral offsetting of the bucket being desirable to allow the bucket contents to be dumped effectively and efficiently into high truck bodies or other elevated receptacles alongside the dump truck.

However, a common difficulty experienced with this type of dump truck is that as the bucket is tilted toward its dump position, it reaches a position wherein the strut load, which till this time has been tensile, is reversed to a compressive load, with the result that if some means is not provided to prevent it, the struts will collapse to shorter lengths, with the result that the bucket pivots on past its normal dumping position, often falling into the bed of the truck into which the bucket contents are being dumped, and causing bending or breakage of the piston rods. The objects of the present invention is the provision of means for the prevention of this occurrence.

More specifically, it is an object of the present invention to provide a locking latch for securing the struts positively in their fully extended positions at all times when the described collapsing action could occur.

Another object is the provision of a latch of the character described which is automatically responsive to the tilt position of the dump bucket, whereby it will be operative or inoperative, as required, at each stage of the dumping operation.

A further object is the provision of a latch of the character described which is controlled by the position of the dump bucket to be activated whenever the bucket is tilted away from its normal upright position, and deactivated when the bucket returns to its upright position.

Other object are simplicity and economy of construction, and efficiency and dependability of operation.

Figure 2:
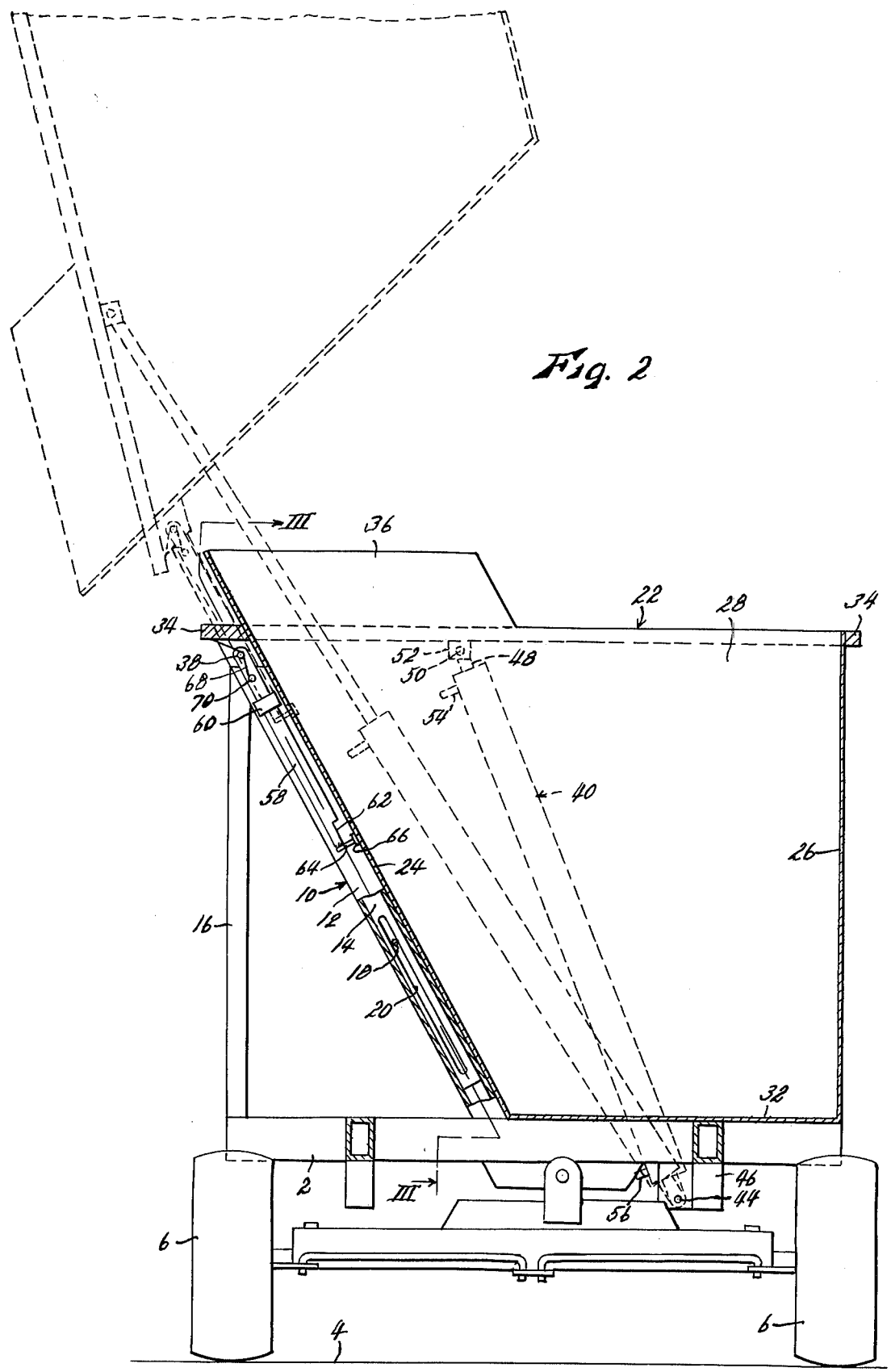

With these objects in view, as well as other objects which will appear in the course of the specification, reference will be had to the accompanying drawing, wherein:

FIG. 1 is a side elevational view, partially broken away, of a dump truck including strut extension locks embodying the present invention, FIG. 2 is a sectional view taken on line II—II of FIG. 1, showing the dump bucket in its lowered position in solid lines, and in its dump position in dotted lines, FIG. 3 is an enlarged, fragmentary sectional view taken on line III—III of FIG. 2, FIG. 4 is a fragmentary sectional view taken on line IV—IV of FIG. 3, with the dump bucket in its normal lowered position, FIG. 5 is a view similar to FIG. 4, but with the dump bucket raised and tilted to its position, and FIG. 6 is an enlarged, fragmentary sectional view taken on line VI—VI of FIG. 4.

Like reference numerals apply to similar parts throughout the several views, and the numeral 2 applies generally to the bed of the dump truck. Its actual detailed structure is not pertinent to the present invention. It constitutes a horizontal, planar rectangular platform, supported above ground level 4 by ground-engaging wheels 6, and may be towed by means of a tongue 8. At each of the front and rear ends of the bed is disposed a strut 10 consisting of a tubular lower section 12, and an upper section 14 telescoped slidably in said lower section. Lower section 12 is affixed at its lower end to bed 2, intermediate the sides of the bed, and slopes upwardly toward one side of the bed, its upper end being disposed substantially in the vertical plane of that side of the bed, and rigidly supported by a vertical upright post 16 projecting upwardly from the bed. Upper section 14 is extendable upwardly from the lower section, always extending therefrom to some degree, its additional upward extension being limited by a stop pin 18 fixed transversely in said lower section and extending through a slot 20 formed longitudinally in the upper section.

Bed 2 also carries a dump bucket 22 including an inclined side wall 24 which rests slidably against the innersides of struts 10, as shown in FIG. 2, an opposite vertical side wall 26 rising from the opposite side edge of base 2, vertical front and rear walls 28 and 30, and a floor 32 normally resting flat on bed 2, said bucket being open at its top. The bucket is formed of sheet metal, and may be reinforced by any suitable means, largely not shown but including a rigid rail 34 affixed thereto and extending horizontally and peripherally therearound at its top edge, above the level of the upper ends of lower strut sections 12. Side wall 24 and adjacent portions of front and rear walls 28 and 30 may be extended above rail 34 to form a pouring "spout" 36 for the bucket, as will appear. The upwardly extended ends of upper strut sections 14 are each pivoted to the lower side of rail 34, as by pivot pin 38, said pins being coaxial on an axis which is horizontal and parallel to the side edge of the bed toward which the struts slope.

At each of the front and rear ends of the bed, a hydraulic ram 40 is disposed. Said ram includes a hydraulic cylinder 42 pivoted at its lower end, as at 44, to a bracket 46 affixed to bed 2, pivots 44 of the two cylinders being coaxial and parallel to pivots 38. The cylinders extend upwardly, being inclined toward the side of the bed toward which struts 10 are inclined, externally of the adjacent end wall of the bucket, and the piston rod 48 of each ram extends axially from its cylinder and is pivoted at its extended end, as at 50, to a bracket 52 affixed to bucket rail 34 at that end of the bucket. Pivots 50 are also coaxial and paralled to pivots 38, and are laterally spaced apart from the axis of pivots 38. Rams 40 are double-acting, each having hydraulic connections 54 and 56, supplied from any suitable source, not shown, by means of which the ram may be selectively extended or retracted as desired. One ram may be the hydraulic "slave" of the other, whereby both will be extended or retracted at the same speed.

The structure thus far described is known, as evidenced in the Kostman Patent above referred to. When rams 40 are extended, bucket 22 is first elevated in an upright position, without tilting, being supported by struts 10, acting as slides, during this movement. It does not tilt since the upper ends of the rams engage the bucket between the vertical plane of pivots 38 and the vertical plane of the center of gravity of the load. Due to the inclination of the struts, the bucket is shifted bodily laterally of bed 2, to the left as shown in FIG. 2 during this elevation. As it is lifted, upper strut sections 14 are extended slidably outwardly from lower sections 12, until the lower ends of slots 20 strike stop pins 18, at which time extension of the struts is arrested. Thereafter, further extension of rams 40 forces the bucket to turn on pivots 38 in a counter-clockwise direction, again as viewed in FIG. 2, to the position in dotted lines in FIG. 2, to dump its contents. It is desirable to tilt the bucket in this manner until side wall 24 slopes downwardly toward its free edge at an angle of about 45 degrees, as shown, in order to assure complete emptying of said bucket. By retracting rams 40, the process is reversed, the bucket first being returned to its upright position, with struts 10 still extended, and then lowered to its original position by retraction of the struts. Both the elevation of the bucket by extension of the struts before tilting, and the bodily lateral movement of the bucket as provided by the inclination of the struts, are necessary in order efficiently to dump the bucket into high beds of trucks parked alongside said bucket.

However, while dump buckets of this form have the advantage that a single set of hydraulic rams provides the elevation and lateral movement of the bucket, as well as the tilting thereof for dumping, a common malfunction thereof occurs as the bucket approaches its dumping position as shown in dotted lines in FIG. 2. As the center of gravity of the bucket and its load approaches and passes through the vertical plane of bucket pivots 38, the load on the struts, which up till this time has been tensile, becomes compressive, causing said struts to "collapse" to shorter lengths. In actual practice, this collapse of the struts often occurs even somewhat before the load center of gravity passes through the vertical plane of pivots 38, due probably to looseness or play in the pivots. If collapse of the pivots does occur, the bucket pivots still farther to the left than shown in FIG. 2, piston rods 48 pass through the axis of pivots 38, and the bucket may ultimately "fall" into the bed of the truck into which the bucket contents are being dumped, resulting inevitably in bending or breakage of the pistion rods, and complete disabling of the device.

The occurrence as above described of course cannot be allowed, and to prevent it the present invention contemplates the use of strut extension locks as shown, one in combination with each of struts 10. Said locks each include an elongated lock bar 58 pivoted at its upper end on pivot pin 38 of the associated strut, and extending downwardly along the side of said strut. Said lock bars are disposed at the confronting faces of the two struts, and immediately adjacent side wall 24 of the bucket when said bucket is upright. Said lock bar extends slidably through a strong U-shaped keeper 60 welded or otherwise affixed to the adjacent wall of lower section 12 of the associated strut, as best shown in FIGS. 4–6, and projects downwardly below said keeper. At a distance below the keeper corresponding to the strut extension permitted by stop pin 18, a notch 62 is formed in the edge of the lock bar confronting the bucket. Below said notch, a pin 64 is affixed to the lock bar and extends toward bucket wall 24, carrying at its extended end a metal pad 66 wich normally engages said bucket wall. A coil spring 68 is mounted on pivot pin 38, having one extended end thereof abutting bucket rail 34, and its other extended end secured to the lock bar below pivot 38 by a rivet 70. Said spring is biased to urge the lock bar pivotally toward the bucket, but the engagement of pad 66 by bucket wall 24 prevents the lock bar from pivoting, and keeps it axially centered with respect to its keeper 60.

Thus, in operation, it will be seen that during elevation of the bucket by the initial extension of rams 40, during which time the bucket remains upright and its wall 24 remains in engagement with lock bar pads 66, lock bars 58 move freely upwardly through keepers 60. When the extension of the struts is arrested by stop pins 18, notches 62 of the lock bars will be disposed within the keepers, although said lock bars are still maintained axially in the keepers by the pressure of bucket wall 24 on pads 66. When the bucket commences its tilting action by reason of further extension of rams 40, its side wall 24 moves away from lock bar pads 66, allowing said lock bars to be pivoted by springs 68 to move a shoulder 72 of lock bar notch 62 laterally to a position directly above the top edge of keeper 60. At this time, shoulder 72 is preferably spaced slightly above the keeper. When the bucket has been tilted to such a position as to exert a compressive load on the struts, said struts retract only so far as to bring notch shoulders 72 into solid engagement with the upper edges of the keepers, and the struts are thereafter "locked" in their extended positions, and prevented from collapsing, by the compressive strength of the lock bars, and so that the malfunction described previously cannot occur.

As the bucket is again tilted toward an upright position, it first reaches a position wherein the disposition of its weight center of gravity again imposes a tensile load on the struts. This extends said struts slightly, or until stop pins 18 are again brought into play, and elevates shoulders 72 of the lock bar notches slightly above keepers 60, so that there can be no frictional resistance to disengagement of the locks. As the bucket is further tilted to its fully upright position, its wall 24 engages pads 66 of the lock bars, and pivots said lock bars against the tension of spring 68 to a coaxial position within the keepers. The final portion of the retraction of rams 40 will then lower the bucket as before to rest on bed 2, since lock bars 58 are then completely inoperative. Thus it is clear that my invention provides a simple, effective, efficient and dependable solution to what has previously been a vexatious problem. And while I have shown and described a specific embodiment of my invention, it will be readily apparent that many minor changes of structure and operation could be made without departing from the spirit of the invention.

What I claim as new and desire to protect by Letters Patent is:

1. In combination with a dump truck including a wheeled bed, slidably extensible struts having a limited degree of extensibility fixed to said bed and extending upwardly therefrom, each of said struts including two slidably telescoped sections, a dump bucket normally resting on said bed and pivoted along one of its upper edges on a horizontal axis to the upper ends of said struts, and power means operable to exert an upward force on said bucket intermediate the vertical planes of its pivotal axis and its center of gravity, whereby said bucket is first elevated in an upright position to the limit of the extensibility of said struts, and then tilted about its pivotal axis to a dump position wherein its weight causes a reversal of the tensile load on said struts to a compressive load, a strut extension lock operable to prevent retraction of said struts under said compressive load, said lock comprising:

a. a locking bar pivoted to one of the sections of said strut on a transverse axis and extending longitudinally of said strut to coextend with a portion of the other section of said strut, a tubular keeper affixed to said other strut section, said locking bar extending slidably through said keeper, said locking bar having a notch formed in a longitudinal edge thereof, said notch being positioned to be brought within said keeper only when said strut is fully extended, and resilient means urging said locking bar pivotally in a direction to move a shoulder of said bar notch into abutting alignment with the end of said keeper facing said one strut section, whereby to lock said strut against longitudinal retraction, and b. control means operable selectively to engage and disengage said extension lock, said control means being operable selectively to restrain said locking bar to a position coaxial with said keeper, against the pressure of said resilient means, or to release said locking bar for movement by said resilient means.

2. A strut extension lock as recited in claim 1 wherein said control means comprises a lateral extension secured to said lock bar in spaced apart relation from its pivot, and extending therefrom to be engaged by said dump bucket whenever said bucket is in its upright position, whereby to restrain said lock bar against said resilient means, and to be disengaged by said bucket whenever said bucket is tilted from its upright position, whereby to free said lock bar for movement by said resilient means.

3. A strut extension lock as recited in claim 2 wherein said lock bar notch is slightly longer, longitudinally of said bar, than the axial length of said keeper, and wherein keeper is disposed midway between the ends of said notch when said strut is fully extended.

* * * * *